United States Patent
Chang (10) Patent No.: US 11,037,560 B2
(45) Date of Patent: Jun. 15, 2021

(54) METHOD, APPARATUS AND STORAGE MEDIUM FOR WAKE UP PROCESSING OF APPLICATION

(71) Applicant: BAIDU ONLINE NETWORK TECHNOLOGY (BEIJING) CO., LTD., Beijing (CN)

(72) Inventor: Xiantang Chang, Beijing (CN)

(73) Assignee: BAIDU ONLINE NETWORK TECHNOLOGY (BEIJING) CO., LTD.X, Beijing (CN)

( * ) Notice: Subject to any disclaimer, the term of this patent is extended or adjusted under 35 U.S.C. 154(b) by 152 days.

(21) Appl. No.: 16/236,285

(22) Filed: Dec. 28, 2018

(65) Prior Publication Data
US 2019/0304449 A1 Oct. 3, 2019

(30) Foreign Application Priority Data
Apr. 2, 2018 (CN) .......................... 201810282805.8

(51) Int. Cl.
*G10L 15/22* (2006.01)
*G06F 9/4401* (2018.01)
*G10L 15/08* (2006.01)

(52) U.S. Cl.
CPC ............ *G10L 15/22* (2013.01); *G06F 9/4418* (2013.01); *G10L 15/08* (2013.01); *G10L 2015/088* (2013.01); *G10L 2015/223* (2013.01)

(58) Field of Classification Search
CPC ............... G10L 15/22; G10L 2015/223; G10L 2015/088; G10L 15/02; G10L 15/08;
(Continued)

(56) References Cited

U.S. PATENT DOCUMENTS 6,629,077 B1 * 9/2003 Arling ..................... G10L 15/26
704/270
9,368,105 B1 * 6/2016 Freed ....................... G10L 15/22
(Continued)

FOREIGN PATENT DOCUMENTS

| CN | 106463112 A | 2/2017 |
| CN | 106875945 A | 6/2017 |

(Continued)

OTHER PUBLICATIONS

WO2018219023, Translation obtained from Global Dossier of Chinese Document Application No. 20170391388.6, retrieved Jul. 20, 2020, pp. 1-7 (Year: 2017).*

(Continued)

*Primary Examiner* — Vijay B Chawan
(74) *Attorney, Agent, or Firm* — J.C. Patents (57) ABSTRACT

The present disclosure provides a method, an apparatus and a storage medium for a wake-up processing of an application, a first voice data input by a user is collected and recognized, and a wake-up operation is performed on a target application each time when it is recognized that a wake-up word of the target application is included in the first voice data, where the wake-up word of the target application appears one or more times in the first voice data. The method, apparatus and storage medium for the wake-up processing of the application provided by the present disclosure can wake up the target application when the wake-up word appears one or more times in the first voice data input by the user, thereby improving a wake-up accuracy of the application.

18 Claims, 2 Drawing Sheets

(58) Field of Classification Search
CPC ... G10L 15/26; G10L 15/30; G10L 2015/081;
G10L 25/21; G10L 15/00; G10L 15/06;
G10L 15/063; G10L 15/083; G10L 15/16;
G10L 15/20; G10L 15/32; G10L 17/02;
G10L 17/04; G10L 17/14; G10L 17/24;
G10L 17/26; G10L 2015/025; G10L
2015/027; G10L 2015/228; G10L
21/0208; G10L 25/78; H04M 1/663;
H04M 1/725; H04M 1/72519; H04M
1/72577; H04M 2250/10; H04N
21/42203; H04N 21/44213; H04N
21/6582
USPC ............ 704/270.1, 270, 275, 231, 233, 254
See application file for complete search history.

(56) References Cited

U.S. PATENT DOCUMENTS

| | | | | |
|---|---|---|---|---|
| 10,043,521 | B2* | 8/2018 | Booklet | G10L 17/14 |
| 10,325,594 | B2* | 6/2019 | Booklet | G10L 15/02 |
| 10,482,879 | B2* | 11/2019 | Tang | G10L 15/02 |
| 10,614,803 | B2* | 4/2020 | Xie | G10L 15/22 |
| 10,629,204 | B2* | 4/2020 | Mitic | G10L 15/22 |
| 2006/0085199 | A1* | 4/2006 | Jain | G10L 15/26 |
| | | | | 704/275 |
| 2011/0145000 | A1* | 6/2011 | Hoepken | G10L 17/00 |
| | | | | 704/275 |
| 2012/0052907 | A1* | 3/2012 | Gilbreath | H04W 4/48 |
| | | | | 455/556.1 |
| 2013/0289994 | A1* | 10/2013 | Newman | H04M 1/72519 |
| | | | | 704/254 |
| 2013/0312019 | A1* | 11/2013 | McMillan | H04H 60/31 |
| | | | | 725/14 |
| 2016/0293168 | A1* | 10/2016 | Chen | G10L 15/22 |
| 2018/0033436 | A1* | 2/2018 | Zhou | G10L 15/00 |
| 2019/0066677 | A1* | 2/2019 | Jaygarl | G10L 15/30 |
| 2019/0147904 | A1* | 5/2019 | Tao | G10L 15/08 |
| | | | | 704/231 |

FOREIGN PATENT DOCUMENTS

| | | |
|---|---|---|
| CN | 107230475 A | 10/2017 |
| CN | 107610695 A | 1/2018 |
| JP | 2016-114744 A | 6/2016 |
| JP | 2017-520012 A | 7/2017 |
| WO | 2016161641 A1 | 10/2016 |
| WO | WO-2019/193590 A1 * 10/2019 | ............ G10L 19/02 |

OTHER PUBLICATIONS

WO2018161473, Translation obtained from Global Dossier of Chinese Document Application No. 201710138703.4, retrieved Jul. 20, 2020, pp. 1-6 (Year: 2017).*
Kepuska, "Wakeup word speech recognition," Speech Technologies, Jun. 2011, pp. 237-262. (Year: 2011).*
The Japanese Examination Report of corresponding Japanese application No. 2018-247645, dated Feb. 18, 2020.
The Chinese First Examination Report of corresponding Chinese application No. 201810282805.8, dated Jan. 22, 2019.

* cited by examiner

METHOD, APPARATUS AND STORAGE MEDIUM FOR WAKE UP PROCESSING OF APPLICATION

CROSS-REFERENCE TO RELATED APPLICATION

This application claims priority to Chinese Patent Application No. 201810282805.8, filed on Apr. 2, 2018, which is hereby incorporated by reference in its entirety.

TECHNICAL FIELD

The present disclosure relates to computer application technologies, and in particular, to a method, an apparatus and a storage medium for a wake-up processing of an application.

BACKGROUND

The existing terminal device for supporting human-machine voice interaction usually needs to perform a wake-up operation first, that is, a user first speaks out the wake-up word to wake up the terminal device, and then the user speaks out the real recognition contents, thereby performing the voice recognition operation.

In the prior art, the terminal device performs the voice wake-up first, and after waked up, the terminal device enters the voice recognition state. When the voice recognition is completed, the terminal device enters the waiting voice wake-up state. However, the existing technical solution can only achieve a one-time wake-up. However, in some scenarios, the user needs to perform continuous wake-up. For example, if the wake-up word is "hello", when the user says "Hello, today, hello, What will the weather be like tomorrow", in the wake-up and recognition scheme in the prior art, the terminal device will be waked up by the first "hello" and then recognizes "today, hello, What will the weather be like tomorrow" as the voice content to be recognized. In summary, since the continuous wake-up of the application cannot be realized for the continuous voice data of the user in the prior art, the wake-up accuracy based on the user voice wake-up application is not high.

SUMMARY

In order to solve the problems existing in the prior art, the present disclosure provides a method, an apparatus and a storage medium for a wake-up processing of an application, which improve the wake-up accuracy of the application.

The present disclosure provides a method for a wake-up processing of an application, including:
collecting a first voice data input by a user;
recognizing the first voice data;
performing a wake-up operation on a target application each time when it is recognized that a wake-up word of the target application is included in the first voice data, where the wake-up word of the target application appears one or more times in the first voice data.

When the wake-up word of the target application appears one time in the first voice data, the method further includes:
performing the wake-up operation on the target application each time when it is recognized that a partial wake-up word of the target application is included in the first voice data.

In an embodiment of the present disclosure, when the wake-up word of the target application appears multiple times in the first voice data, the method further includes:
controlling the target application to stop a voice recognition operation performed on a voice data before the wake-up word when the wake-up word is recognized the $i^{th}$ time in the first voice data.

In an embodiment of the present disclosure, the method further includes:
performing the voice recognition operation on the voice data after the wake-up word in the first voice, after performing the wake-up operation on the wake-up word which appears the $i^{th}$ times in the first voice data, wherein the i is a positive integer greater than or equal to 2.

In an embodiment of the present disclosure, performing the voice recognition operation on the voice data after the wake-up word in the first voice, includes:
sending the voice data after the wake-up word to a server, so that the server recognizes the voice data after the wake-up word.

In an embodiment of the present disclosure, a starting position of the voice data after the wake-up word in the first voice is an end position of the wake-up word in the first voice data.

In an embodiment of the present disclosure, the method further includes:
determining the end position of the recognized wake-up word in the first voice data and a length information of the recognized wake-up word;
determining, according to the end position and the length information, a starting position of the recognized wake-up word in the first voice data;
determining the starting position as a clipped starting position.

In an embodiment of the present disclosure, the method further includes:
transmitting the length information and/or the recognized wake-up word to the server, wherein the length information and/or the recognized wake-up word are used to instruct the server to determine the voice data to be recognized from the first voice data.

In an embodiment of the present disclosure, the method further includes:
determining a weight value according to an environment information when the first voice data is collected, wherein the weight value indicates reliability of the first voice data;
sending the weight value to the server, wherein the weight value is used to instruct the server to determine whether the recognized wake-up word needs to be recognized the second time.

The present disclosure provides an apparatus for a wake-up processing of an application, including:
a collecting module, configured to collect a first voice data input by a user;
a recognition module, configured to recognize the first voice data;
a wake-up module, configured to perform a wake-up operation on a target application each time when it is recognized that a wake-up word of the target application is included in the first voice data, wherein the wake-up word of the target application appears one or more times in the first voice data.

The present disclosure provides an apparatus for a wake-up processing of an application, includes a processor and a computer-readable medium for storing program codes, which, when executed by the processor, cause the processor to:

collect a first voice data input by a user;

recognize the first voice data;

perform a wake-up operation on a target application each time when it is recognized that a wake-up word of the target application is comprised in the first voice data, wherein the wake-up word of the target application appears one or more times in the first voice data.

In an embodiment of the present disclosure, when the wake-up word of the target application appears one time in the first voice data, wherein the program codes further cause the processor to:

perform the wake-up operation on the target application each time when it is recognized that a partial wake-up word of the target application is in the first voice data.

In an embodiment of the present disclosure, when the wake-up word of the target application appears multiple times in the first voice data, wherein the program codes further cause the processor to:

control the target application to stop a voice recognition operation performed on a voice data before the wake-up word when the wake-up word is recognized the $i^{th}$ time in the first voice data.

In an embodiment of the present disclosure, wherein the program codes further cause the processor to:

perform the voice recognition operation on the voice data after the wake-up word in the first voice, after performing the wake-up operation on the wake-up word which appears the $i^{th}$ times in the first voice data, wherein the i is a positive integer greater than or equal to 2.

In an embodiment of the present disclosure, wherein the program codes further cause the processor to:

send the voice data after the wake-up word to a server, so that the server recognizes the voice data after the wake-up word.

In an embodiment of the present disclosure, a starting position of the voice data after the wake-up word in the first voice is an end position of the wake-up word in the first voice data.

In an embodiment of the present disclosure, wherein the program codes further cause the processor to:

determine the end position of the recognized wake-up word in the first voice data and a length information of the recognized wake-up word;

determine, according to the end position and the length information, a starting position of the recognized wake-up word in the first voice data;

determine the starting position as a clipped starting position.

In an embodiment of the present disclosure, wherein the program codes further cause the processor to:

transmit the length information and/or the recognized wake-up word to the server, wherein the length information and/or the recognized wake-up word are used to instruct the server to determine the voice data to be recognized from the first voice data.

In an embodiment of the present disclosure, wherein the program codes further cause the processor to:

determine a weight value according to an environment information when the first voice data is collected, and the weight value indicates reliability of the first voice data;

send the weight value to the server, and the weight value is used to instruct the server to determine whether the recognized wake-up word needs to be recognized the second time.

The present disclosure also provides an electronic device readable storage medium, including: a program, when the program is running on an electronic device, causing the electronic device to perform the method according to any one of the above embodiments.

The present disclosure provides a method, an apparatus, and a storage medium for a wake-up processing of an application, a first voice data input by a user is collected and recognized, and a wake-up operation is performed on a target application each time when it is recognized that a wake-up word of the target application is included in the first voice data, where the wake-up word of the target application appears one or more times in the first voice data. The method, apparatus and storage medium for the wake-up processing of the application provided by the present disclosure can wake up the target application when the wake-up word appears one or more times in the first voice data input by the user, thereby improving a wake-up accuracy of the application.

BRIEF DESCRIPTION OF DRAWINGS

In order to more clearly illustrate the embodiments of the present disclosure or the technical solutions in the prior art, the drawings used in the embodiments or the description of the prior art will be briefly described below. Obviously, the drawings in the following description are merely some embodiments of the present disclosure, and other drawings can be acquired from these drawings by the person ordinarily skilled in the art without inventive work.

DESCRIPTION OF EMBODIMENTS

The technical solutions in the embodiments of the present disclosure are clearly and completely described in the following with reference to the accompanying drawings in the embodiments of the present disclosure. It is obvious that the described embodiments are merely a part of the embodiments of the present disclosure, and not all of the embodiments. All other embodiments acquired by those skilled in the art based on the embodiments of the present disclosure without inventive work are within the scope of the present disclosure.

The terms "first", "second", "third", "fourth", etc. (if present) in the specification, claims and the above figures of the present disclosure are used to distinguish similar objects without having to use to describe a specific order or sequence. It is to be understood that the used terms may be interchangeable, where appropriate, so that the embodiments of the present disclosure described herein can be implemented in a sequence other than those illustrated or described herein. In addition, the terms "comprises" and "have" and any variants thereof are intended to cover a non-exclusive inclusion, for example, a process, method, system, product or apparatus comprising a series of steps or units is not necessarily limited to those steps or units that are clearly listed, but may include other steps or units not explicitly listed or inherent to the process, method, product or apparatus.

Figure 1:
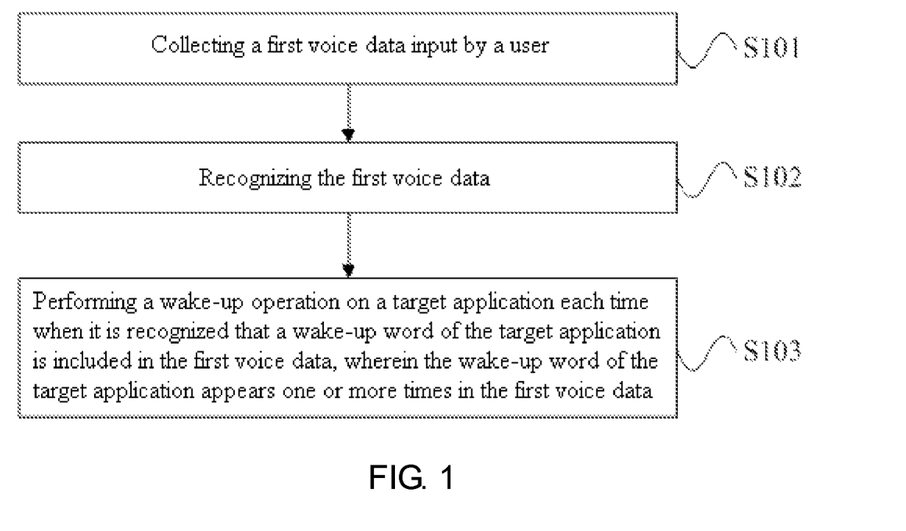
FIG. 1 is a schematic flowchart of Embodiment one of a method for a wake-up processing of an application of the present disclosure.

FIG. 1 is a schematic flowchart of Embodiment one of a method for a wake-up processing of an application of the present disclosure. As shown in FIG. 1, the method for the wake-up processing of the application provided by this embodiment includes:

S101: collecting a first voice data input by a user;

S102: recognizing the first voice data;

S103: performing a wake-up operation on a target application each time when it is recognized that a wake-up word of the target application is included in the first voice data, wherein the wake-up word of the target application appears one or more times in the first voice data.

The execution body of this embodiment may be an electronic device having voice collecting and processing functions. For example, the electronic device can be a laptop computer, including a computer monitor of an embedded computer, a tablet computer, a cellular phone, a media player or other handheld or portable electronic device, smaller devices with display function such as a watch device, a pendant device, an earphone or an earbud device or other wearable or micro device, and a television set, a computer display without an embedded computer, a game device, a navigation device, an embedded system (e.g., a system wherein an electronic device having a display is installed in a kiosk or a car), a function device that implements two or more of these devices, or a computer (Computer), a notebook (Notebook), a pad (Pad), a smart phone (Smart Phone), or a smart watch (Smart Watch), smart glasses, a workstation, a database or a server, etc.

Specifically, the electronic device may collect the voice expressed by the user as the first voice data through a voice device such as a microphone or a headset, and perform a recognition processing on the first voice data. At the same time, each target application in the electronic device is provided with a special wake-up word for waking up the target application corresponding to the wake-up word when the wake-up word appears in the first voice data of the user. For example, a wake-up word corresponding to a photo management application is "album", and a wake-up word corresponding to a weather forecast application is "weather". It should be noted that the application here may also be the electronic device itself, for example, the special air purifier has only the function of air purification, and a wake-up word corresponding to an air purification application in the air purifier is "purification". Therefore, when the first voice data of the user acquired by the air purifier is "purification, start", the air purification application is woken up. That is, the air purifier itself is woken up and responds to the wake-up by the application within the air purifier.

However, a wake-up word corresponding to an application appears multiple times in one sentence due to a slip of tongue or repeated expression when the user outputs the question he wants to express through the language. For example, a wake-up word corresponding to a weather forecast application is "Hello". When a user wants to ask about the weather, the first voice data expressed by the user which is acquired by the electronic device is "Hello, today, hello, how will the weather be like tomorrow". Obviously, due to a slip of tongue of the user, there is a wrong expression "today" in the sentence intended to ask for the weather of tomorrow. However, the scheme for recognizing the voice data and waking up the application in the prior art cannot accurately recognize the real meaning to be expressed by the user in the first voice data.

Therefore, in S103 of the present embodiment, in the first voice data, each time when it is recognized that the wake-up word appears in the first voice data, the target application corresponding to the wake-up word is woken, so that the target application can perform the voice recognition operation on the voice data after each wake-up word. For example, in the above example, the wake-up word "hello" appears twice in the first voice data, and the electronic device wakes up the target application weather forecast after the first "Hello" appears, and makes the weather forecast perform the voice recognition operation on "Hello"; after the second "hello" appears, the target application weather forecast is woken up, so that the weather forecast performs a voice recognition operation on "what will the weather be like tomorrow". Thus, the target application is woken after each wake-up word in the ambiguous first voice data repeatedly expressed by the user appears. Compared with the case in the prior art that the target application is woken by the entire first voice data and the entire first voice data "today, hello, what will the weather be like tomorrow" is recognized, the existing sentence is obviously a wrong sentence in structure, and is not good for the recognition of the target application. The method for the wake-up processing of the application provided by the present embodiment wakes up the target application after each wake-up word in the first voice data expressed one time by the user, thereby improving the wake-up accuracy of the application, and further reducing the difficulty of voice recognition when the application performs the voice recognition operation on the voice data after the wake-up word.

Optionally, in the foregoing embodiment, if the wake-up word of the target application appears one time in the first voice data, each time when it is recognized that a partial wake-up word of the target application is included in the first voice data, the wake-up operation is performed on the target application. For example, a wake-up word corresponding to one image processing application is "image processing", and when a user wants to process images in the album through the image processing application, the electronic device collects the first voice data expressed by the user which is "image processing, beauty image". Then, when the electronic device can recognize the "image" which is the first half part of the wake-up word "image processing", the image processing application is immediately woken up and then the image processing application performs a voice recognition operation on the "beauty image". By this way, when the wake-up word is set longer or the processing of the electronic device is slow, the target application can be woken up after the partial wake-up word is recognized by means of early wake-up, which improves the wake-up efficiency of the application and enhances the user experience. It should be noted that the selection of the partial wake-up word in this example is only an example. In practice, the first M words of the wake-up word with N words may be set as the partial wake-up word according to parameters such as the length N of the wake-up word, the content, or the user's speech rate, and the application is waken up according to the set partial wake-up word.

Further optionally, in the above embodiment, if the wake-up word of the target application appears multiple times in the first voice data, when the wake-up word is recognized in the first voice data the $i^{th}$ time, the target application is controlled to stop the voice recognition operation performed by the voice data before the wake-up word. And optionally, the voice recognition operation is performed on the voice data after the wake-up word in the first voice after the wake-up operation is performed on the wake-up word which appears in the first voice data the $i^{th}$ times, where the i is a positive integer greater than or equal to 2.

For example, in the above example, for the first voice data "Hello, today, hello, what will the weather be like tomorrow" expressed by the user and acquired by the electronic device, there are two wake-up words "Hello". Obviously, the voice data after the first "hello" is a wrong and meaningless data, however, the target application needs to perform the voice recognition on the wrong data "today". Then, in this embodiment, after it is recognized when the "hello" appears in the first voice data the second time, the target application is control to stop performing the voice recognition operation on "today", and to perform the voice recognition operation on "what will the weather be like tomorrow" after the second "hello". Therefore, the present embodiment can cancel the previous voice recognition operation instead of maintaining the waiting state after the first wake-up, if this voice recognition is not officially yet over, and the user starts a new voice wake-up again. The user's voice wake-up and voice recognition request can be responded in time, and the problem that the user has a waiting time for voice interaction again is solved. Therefore, it is possible to prevent the unintentional voice data from being performed by the target application when the wake-up word appears multiple times, which reduces the number of times that the target application performs the invalid recognition, and further improves the wake-up accuracy of the application to some extent.

Optionally, in the foregoing embodiments, performing the voice recognition operation on the voice data after the wake-up word in the first voice includes: sending the voice data after the wake-up word to a server, so that the server recognizes the voice data after the wake-up word.

Preferably, in each of the above embodiments, a starting position of the voice data after the wake-up word in the first voice is an end position of the wake-up word in the first voice data.

Specifically, the foregoing method includes: determining an end position of the recognized wake-up word in the first voice data and length information of the recognized wake-up word; determining, according to the end position and the length information, a starting position of the recognized wake-up word in the first voice data; and determining the starting position as a clipped starting position.

Specifically, the above method includes: transmitting the length information and/or the recognized wake-up word to the server, and the length information and/or the recognized wake-up word are used to instruct the server to determine the voice data to be recognized from the first voice data.

Figure 2:
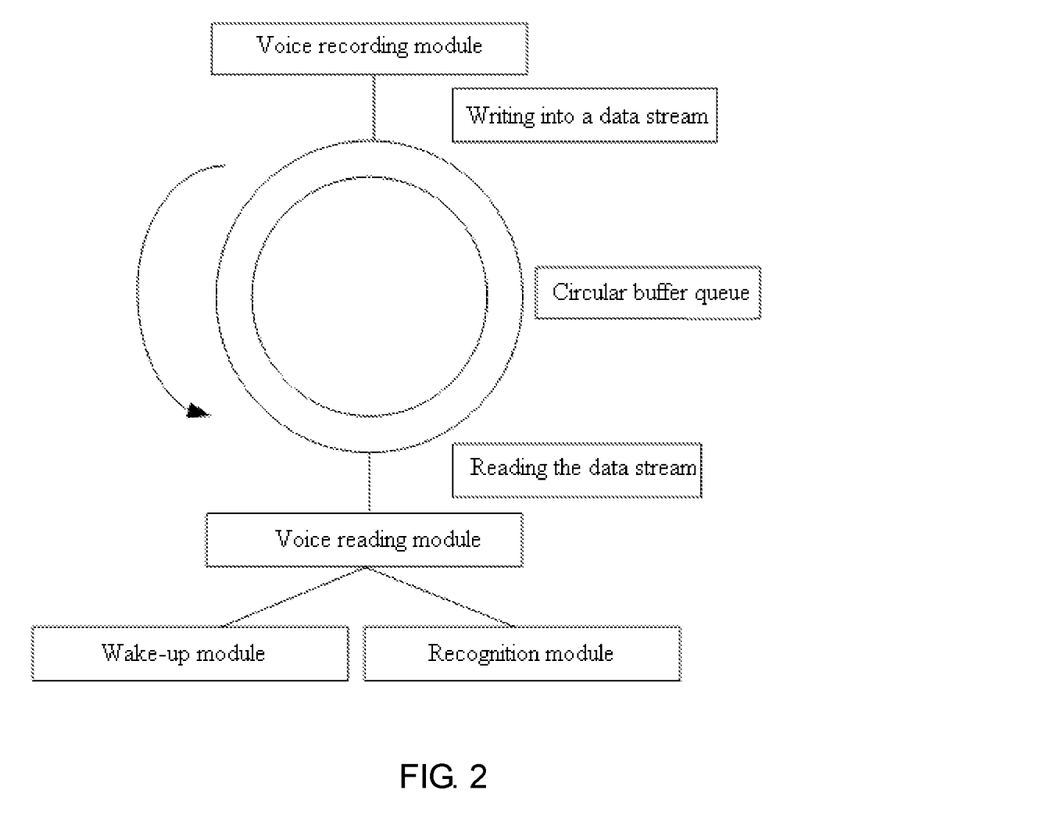
FIG. 2 is a schematic flowchart of Embodiment two of a method for a wake-up processing of an application of the present disclosure.

For example, FIG. 2 is a schematic flowchart of Embodiment two of a method for a wake-up processing of an application of the present disclosure. In the prior art, the electronic device has a certain degree of delay for the voice wake-up of the wake-up word in the voice data of the user. For example, the first voice data which is expressed by the user and acquired by the electronic device is "Hello, how is the weather in Beijing today", however, due to the delay of the voice wake-up, "how" after the wake-up word in the voice data may be missed, and only the voice data "is the weather in Beijing today" after the wake-up word is recognized, which reduces the wake-up accuracy of the application as well as the voice data recognition accuracy of the application. Therefore, in the embodiment of the present application as shown in FIG. 2, after a voice recording module of the electronic device collects the voice data of the user, the voice data is sent to a circular buffer queue by writing the voice data into a data stream. The circular buffer queue can be designed to hold, for example, 15 seconds of voice data. When the 15-second circular buffer is filled up, the data in the 16th second will cover the data in the 1st second, and it will be cycled in order. Among them, according to the experience, the speed of voice data expressed by human beings is usually 16 k/s, so the data size of the circular buffer queue is 15*16 k=240 k, and it can be realized by using the memory space of the electronic device. A voice reading module shown in FIG. 2 is configured to continuously read the recorded data from the circular buffer queue, and the recorded data read each time can be regarded as the first voice data in the above embodiment. After acquiring the first voice data from the circular buffer queue, the voice reading module sends the first voice data to a wake-up module shown in FIG. 2, and the wake-up module recognizes and wakes up the first voice data. After the voice wake-up is successful, starting from an end point of the wake-up word (the bit after the end of the voice data "Hello" is the end point of the wake-up word), the voice reading module pushes the subsequent voice data to the recognition module in FIG. 2 for voice data recognition, that is, the target application performs the voice recognition operation on the voice data after each wake-up word in Embodiment one. Where, the recognition module shown in FIG. 2 may be disposed on the server, the voice reading module on the electronic device sends all the data after the wake-up word to the server, and the server recognizes the voice data after the wake-up word.

In particular, the voice reading module in the present embodiment can continuously read the voice data from the circular buffer queue, and the voice data read each time is used as the first voice data in the above embodiments. Moreover, the frequency at which the voice reading module reads the voice data should be set to be greater than the frequency at which the circular buffer queue is completely updated one time, so that all the voice data acquired and stored in the circular buffer queue can be recognized without being missed. For example, in the above example, after "Hello, how is the weather in Beijing today?" in the above embodiments are all sent into the circular buffer queue, the acquisition, recognition and subsequent application wake-up of the voice data will be started so as to ensure that all voice data can be recognized without being missed, which solves the problem of continuous wake-up of voice, and improves the wake-up accuracy of application and the voice recognition accuracy of application.

More specifically, in order to more accurately read the voice data after the wake-up word in the first voice data from the circular buffer queue, the starting position of the wake-up word needs to be acquired. In this embodiment, when reading the wake-up word existing in the first voice data and acquiring the starting point position information of the wake-up word, the voice reading module pushes all the voice data after the starting point to the voice recognition module in FIG. 2. In practical applications, if the starting position of the wake-up word cannot be acquired, after the position information of the end of the wake-up word (the bit after the end of the voice data "Hello" is the position of the end of the wake-up word) is acquired, the N seconds of data from the end position is considered to be the starting position of the wake-up word. Where N seconds is an experience value, and it takes 1 second for the user to say the word "hello" according to the observation, for example. Then, the voice reading module in the present embodiment sends both the voice data of the wake-up word and the voice data to be recognized after the wake-up word to the recognition module for recognition, and carries the length of the wake-up word voice data and the recognition result simultaneously. Thereby, the recognition module divides the received first voice data into two parts according to the length, the former part of the data is the voice data of the wake-up word, and the latter part of the data is the voice data of the voice to be recognized.

Optionally, the method in the foregoing embodiments further includes: determining a weight value according to the environment information when the first voice data is collected, the weight value indicates the reliability of the first voice data; sending the weight value to the server, where the weight value is used to instruct the sever to determine whether the recognized wake-up word needs to be recognized the second time. Specifically, since the recognition module can be generally disposed in the cloud, the recognition module can also recognize the wake-up word therein the second time when receiving the voice data after the wake-up word in the first voice data. If the recognized result is the same as the judgment result of the wake-up module disposed on the electronic device for the wake-up word, it is considered as a correct wake-up; if the results are different, it is considered as a wrong wake-up. Alternatively, when the wake-up module on the electronic device recognizes the wake-up word in the first voice data, one weight value is carried. If the weight value is greater than a preset threshold, it is subject to the recognition result of the local wake-up module, and a re-recognition for the wake-up data does not need to be performed on the cloud; conversely, if the weight value is less than the preset threshold, the recognition module needs to perform a confirmation the second time. For example, after the first voice data of the user collected is recognized by the wake-up module in a quiet environment, the data is considered to be reliable, a larger weight value, such as 90%, is carried, and the weight value judged in the cloud is greater than 50%, then the wake-up word does not need to be confirmed and judged again. When the first voice data of the user is recognized by the wake-up module in a noisy environment, the data may be considered unreliable, a smaller weight value, such as 20%, is carried, and the weight value judged in the cloud is less than 50%, then, the wake-up word needs to be confirmed and judged again, which further improves the wake-up accuracy of the application and the voice recognition accuracy of the application.

Figure 3:
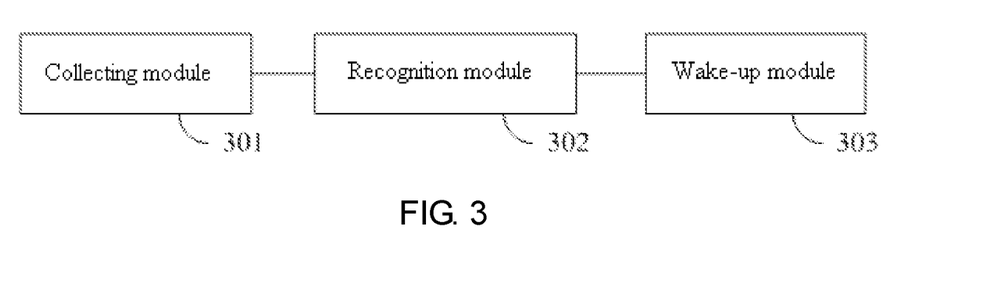
FIG. 3 is a schematic structural diagram of Embodiment one of an apparatus for a wake-up processing of an application of to the present disclosure.

FIG. 3 is a schematic structural diagram of Embodiment one of an apparatus for a wake-up processing of an application of the present disclosure. As shown in FIG. 3, the apparatus for the wake-up processing of the application in this embodiment includes: a collecting module 301, a recognition module 302 and a wake-up module 303.

Where the collecting module 301 is configured to collect a first voice data input by a user; the recognition module 302 is configured to recognize the first voice data; and the wake-up module 303 is configured to perform a wake-up operation on a target application each time when it is recognized that the wake-up word of the target application is included in the first voice data, where the wake-up word of the target application appears one or more times in the first voice data.

The apparatus for the wake-up processing of the application provided in the present embodiment is configured to perform the method for the wake-up of the application in the embodiment shown in FIG. 1, and since both of them have the same technical features and technical effects, the details are not described herein again.

Optionally, in the foregoing embodiments, when the wake-up word of the target application appears once in the first voice data, the wake-up module 303 is further configured to perform a wake-up operation on the target application each time when it is recognized that a partial wake-up word of the target application is included in the first voice data.

Optionally, in the above embodiments, when the wake-up word of the target application appears multiple times in the first voice data, the wake-up module 303 is further configured to control the target application to stop the voice recognition operation performed on the voice data before the wake-up word when the wake-up word is recognized the $i^{th}$ time in the first voice data.

Optionally, in the foregoing embodiments, the recognition module 302 is further configured to perform the voice recognition operation on the voice data after the wake-up word in the first voice, after the wake-up operation is performed on the wake-up word which appears the $i^{th}$ time in the first voice data, where i is a positive integer greater than or equal to 2.

Optionally, in the foregoing embodiments, the recognition module 302 is specifically configured to send the voice data after the wake-up word to the server, so that the server recognizes the voice data after the wake-up word.

Optionally, in the foregoing embodiments, a starting position of the voice data after the wake-up word in the first voice is an end position of the wake-up word in the first voice data.

Optionally, in the foregoing embodiments, the recognition module 302 is further configured to determine the end position of a recognized wake-up word in the first voice data, and recognize length information of the recognized wake-up word;

determine, according to the end position and the length information, a starting position of the recognized wake-up word in the first voice data; and determine the starting position as a clipped starting position.

Optionally, in the foregoing embodiments, the recognition module 302 is further configured to send the length information and/or the recognized wake-up word to the server, where the length information and/or the recognized wake-up word are used to instruct the server to determine a voice data to be recognized from the first voice data.

Optionally, in the foregoing embodiments, the recognition module 302 is further configured to determine a weight value according to the environment information when the first voice data is collected, where the weight value indicates the reliability of the first voice data; and send the weight value to the server, where the weight value is used to instruct the server to determine whether the recognized wake-up word needs to be recognized the second time.

The apparatus for the wake-up processing of the application provided by the foregoing embodiment is configured to perform the method for the wake-up of the application in the embodiment shown in the foregoing embodiments, and both of them have the same technical features and technical effects, thus the details are not described herein again.

The present disclosure also provides an electronic device readable storage medium comprising a program, and when running on an electronic device, the program causes the electronic device to perform the method for the wake-up of the application according to any one of the above embodiments.

An embodiment of the present disclosure further provides an electronic device, including:

a processor; and, a memory, configured to store executable instructions of the processor;

where the processor is configured to perform the method for the wake-up processing of the application in any of the above embodiments via execution of the executable instructions.

An embodiment of the present disclosure further provides an apparatus for a wake-up processing of an application, including:

a memory, a processor, and a computer program stored in the memory. The processor runs the computer program to execute the method for the wake-up processing of the application described in the above embodiments.

An embodiment of the present disclosure further provides a storage medium, including:

a readable storage medium and a computer program, the computer program is stored on the readable storage medium for implementing the method for the wake-up processing of the application described in the above embodiments.

An embodiment of the present disclosure further provides a program product, including:

a computer program (i.e., an execution instruction), the computer program is stored in a readable storage medium. At least one processor of an encoding device can read the computer program from a readable storage medium, and the at least one processor executes the computer program such that the encoding device implements the method for the wake-up processing of the application provided by the various embodiments described above.

It will be understood by those skilled in the art that all or part of the steps for implementing the above method embodiments may be done by hardware related to the program instruction. The aforementioned program can be stored in a computer readable storage medium. The program, when executed, performs the steps including the foregoing method embodiments; and the foregoing storage medium includes various media that can store program codes, such as a ROM, a RAM, a magnetic disk or an optical disk.

Finally, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not make the essence of the corresponding technical solution deviate from the scope of the technical solutions of the embodiments of the present disclosure.

What is claimed is:

1. A method for a wake-up processing of an application, comprising:

collecting a first voice data input by a user;

recognizing the first voice data;

performing a wake-up operation on a target application each time when it is recognized that a wake-up word of the target application is comprised in the first voice data, wherein the wake-up word of the target application appears more times in the first voice data;

controlling the target application to stop a voice recognition operation performed on a voice data before the wake-up word when the wake-up word is recognized the $i^{th}$ time in the first voice data.

2. The method according to claim 1, wherein when the wake-up word of the target application appears more times in the first voice data, the method further comprises:

performing the wake-up operation on the target application each time when it is recognized that a partial wake-up word of the target application is comprised in the first voice data, wherein a first M words of the wake-up word with N words are set as the partial wake-up word according to parameters of a length N of the wake-up word, a content, or a user's speech rate.

3. The method according to claim 1, wherein the method further comprises:

performing the voice recognition operation on the voice data after the wake-up word in the first voice, after performing the wake-up operation on the wake-up word which appears the $i^{th}$ times in the first voice data, wherein the i is a positive integer greater than or equal to 2.

4. The method according to claim 3, wherein performing the voice recognition operation on the voice data after the wake-up word in the first voice, comprises:

sending the voice data after the wake-up word to a server, so that the server recognizes the voice data after the wake-up word.

5. The method according to claim 4, wherein the method further comprises:

determining a starting position of the voice data after the wake-up word in the first voice as an end position of the wake-up word in the first voice data.

6. The method according to claim 5, wherein the method further comprises:

determining the end position of the recognized wake-up word in the first voice data and a length information of the recognized wake-up word;

determining, according to the end position and the length information, a starting position of the recognized wake-up word in the first voice data;

determining the starting position as a clipped starting position.

7. The method according to claim 6, wherein the method further comprises:

transmitting the length information and/or the recognized wake-up word to the server, wherein the length information and/or the recognized wake-up word are used to instruct the server to determine the voice data to be recognized from the first voice data.

8. The method according to claim 7, wherein the method further comprises:

determining a weight value according to an environment information when the first voice data is collected, wherein the weight value indicates reliability of the first voice data;

sending the weight value to the server, wherein the weight value is used to instruct the server to determine whether the recognized wake-up word needs to be recognized the second time; wherein when the weight value judged in the server is greater than 50%, the server determines the recognized wake-up word does not need to be recognized the second time.

9. An apparatus for a wake-up processing of an application, comprising:

a collecting module, configured to collect a first voice data input by a user;

a recognition module, configured to recognize the first voice data;

a wake-up module, configured to perform a wake-up operation on a target application each time when it is recognized that a wake-up word of the target application is comprised in the first voice data, wherein the wake-up word of the target application appears more times in the first voice data, control the target application to stop a voice recognition operation performed on a voice data before the wake-up word when the wake-up word is recognized the $i^{th}$ time in the first voice data.

10. An apparatus for a wake-up processing of an application, comprises a processor and a non-transitory computer-readable medium for storing program codes, which, when executed by the processor, cause the processor to:
  collect a first voice data input by a user;
  recognize the first voice data;
  perform a wake-up operation on a target application each time when it is recognized that a wake-up word of the target application is comprised in the first voice data, wherein the wake-up word of the target application appears more times in the first voice data;
  control the target application to stop a voice recognition operation performed on a voice data before the wake-up word when the wake-up word is recognized the $i^{th}$ time in the first voice data.

11. The apparatus according to claim 10, wherein when the wake-up word of the target application appears more times in the first voice data, wherein the program codes further cause the processor to:
  perform the wake-up operation on the target application each time when it is recognized that a partial wake-up word of the target application is comprised in the first voice data, wherein a first M words of the wake-up word with N words are set as the partial wake-up word according to parameters of a length N of the wake-up word, a content, or a user's speech rate.

12. The apparatus according to claim 10, wherein the program codes further cause the processor to:
  perform the voice recognition operation on the voice data after the wake-up word in the first voice, after performing the wake-up operation on the wake-up word which appears the $i^{th}$ times in the first voice data, wherein the i is a positive integer greater than or equal to 2.

13. The apparatus according to claim 12, wherein the program codes further cause the processor to:
  send the voice data after the wake-up word to a server, so that the server recognizes the voice data after the wake-up word.

14. The apparatus according to claim 13, wherein the program codes further cause the processor to:
  determine a starting position of the voice data after the wake-up word in the first voice as an end position of the wake-up word in the first voice data.

15. The apparatus according to claim 14, wherein the program codes further cause the processor to:
  determine the end position of the recognized wake-up word in the first voice data and a length information of the recognized wake-up word;
  determine, according to the end position and the length information, a starting position of the recognized wake-up word in the first voice data;
  determine the starting position as a clipped starting position.

16. The apparatus according to claim 15, wherein the program codes further cause the processor to:
  transmit the length information and/or the recognized wake-up word to the server, wherein the length information and/or the recognized wake-up word are used to instruct the server to determine the voice data to be recognized from the first voice data.

17. The apparatus according to claim 16, wherein the program codes further cause the processor to:
  determine a weight value according to an environment information when the first voice data is collected, and the weight value indicates reliability of the first voice data;
  send the weight value to the server, and the weight value is used to instruct the server to determine whether the recognized wake-up word needs to be recognized the second time; wherein when the weight value judged in the server is greater than 50%, the server determines the recognized wake-up word does not need to be recognized the second time.

18. A non-transitory electronic device readable storage medium, comprising: a program, when the program is running on an electronic device, causing the electronic device to perform the method according to claim 1.

* * * * *